July 28, 1959     J. S. COONEY     2,896,981
ROD JOINT

Filed Aug. 5, 1953     2 Sheets-Sheet 1

Inventor,
James S. Cooney,
by Townsend M. Gunn
Atty.

July 28, 1959 J. S. COONEY 2,896,981
ROD JOINT
Filed Aug. 5, 1953 2 Sheets-Sheet 2
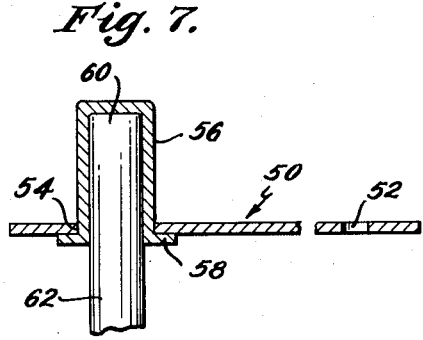
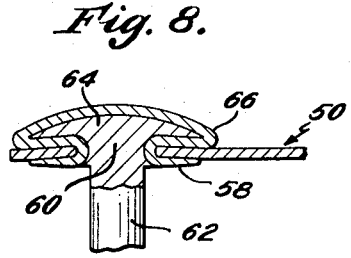
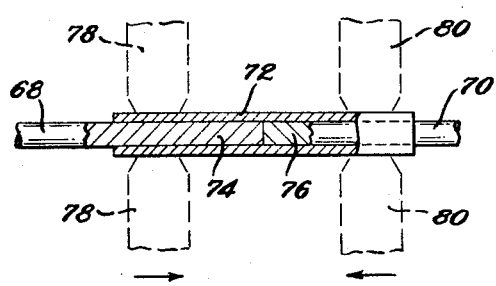
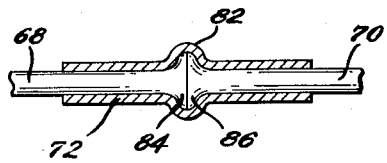
Inventor,
James S. Cooney,
by Townsend M. Gunn
Atty.

United States Patent Office 2,896,981
Patented July 28, 1959

2,896,981

ROD JOINT

James S. Cooney, Attleboro, Mass., assignor to Pylon Company, Inc., Attleboro, Mass.

Application August 5, 1953, Serial No. 372,562

2 Claims. (Cl. 287—20.5)

This invention relates to a joint between a rod or wire and another element, and the method of making it. In particular it relates to an electrical joint between an electrical conductor and a terminal piece, or between two electrical conductors.

In the assembly of electrical apparatus or electrical wiring circuits, it often is necessary to fasten a terminal piece or lug to the end of a wire, or to join two wires together in end-to-end relation, firmly and with good conductivity. Solder has been used, but in some instances, however, solder cannot be used. For example, where aluminum wires are to be fastened to a terminal lug, it is difficult to make a solder joint; or, in other instances, speed of production and mechanical strength demand that a mechanical joint be used without soldering. Conventional forms of solderless lugs do not always provide, in many instances, the degree of mechanical strength or electrical conductivity required. This is particularly true in connection with aluminum conductors, or other metals which either are mechanically weak (as is aluminum), or are either already coated with oxides which have high electrical resistance or form such oxides readily. Another problem in connection with terminal connections is that of corrosion when dissimilar metals such as copper and aluminum are fastened together.

The general object of the invention, therefore, is to provide a quickly and easily made joint between an electrical conductor and another electrical conductor such as a terminal or wire, where the joint is strong and has good electrical conductivity.

Another object of the invention is to provide a solderless terminal structure or member of novel and highly useful type.

A further object of the invention is to provide a simple and inexpensive method of joining a sheet metal terminal member to a wire member, or two wire members in end-to-end relation.

A still further object of the invention is to provide a mechanical and electrical joint between two different metals where the metals are so arranged as to have a minimum of corrodibility.

Other objects and advantages of the invention will be in part apparent and in part pointed out hereinafter.

The invention accordingly comprises the elements and combinations of elements, steps and sequence of steps, features of construction and manipulation, and arrangements of parts which will be exemplified in the structures hereinafter described, and the scope of the application of which will be indicated in the following claims.

In the accompanying drawings, in which several of various possible embodiments of the invention are illustrated, Fig. 1 is a plan view of a terminal used in one embodiment of this invention;

Fig. 7 is a sectional elevation of a subassembly of a fourth embodiment of the invention;

Fig. 8 is a sectional elevation of the Fig. 7 subassembly completed in a finished joint;

Fig. 9 is a sectional elevation of a fifth embodiment of the invention, showing a subassembly of two wires or conductors about to be joined in end-to-end relation; and Fig. 10 is a sectional elevation of the Fig. 9 subassembly completed into a joint.

Similar reference characters indicate corresponding parts throughout the several views of the drawings.

Figure 1:
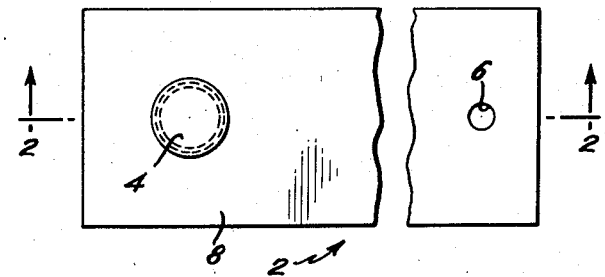
Figure 2:
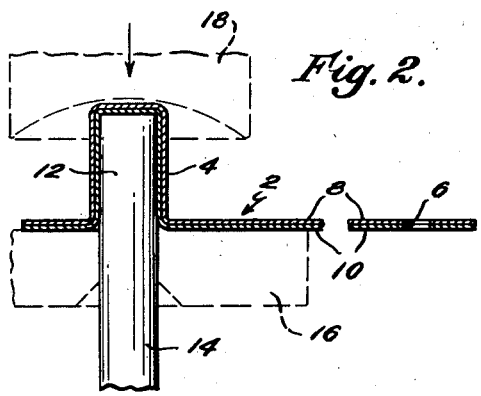
Fig. 2 is a sectional elevation of the Fig. 1 terminal, taken in the direction of sight lines 2—2 on Fig. 1, and showing a wire inserted therein preparatory to being fastened.
Figure 3:
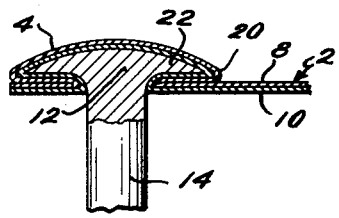
Fig. 3 is a sectional elevation of the Fig. 2 joint of this invention, illustrating the Figs. 1 and 2 embodiment in completed form.

Turning now to Figs. 1–3 for a more detailed description of one embodiment of the invention, a sheet metal terminal 2 has formed therein near one end a cup or sleeve 4 with a closed end. (A hole 6 is provided near the end of the member 2 for making connection, if desired, to a stationary binding post.) In this instance, as an example, the terminal 2 is made of composite laminated sheet metal, one component 8 being of copper and the other component 10 being of aluminum, (although other suitable metals could be used); components 8 and 10 being bonded together over their entire interfacial areas by any of well-known bonding methods. In this exemplary construction, it will be noted that the inside layer of sleeve 4 is of aluminum.

Referring to Fig. 2, there is shown inserted into sleeve 4 one end 12 of wire 14 which is to be fastened to terminal number 2. Since the inside layer of sleeve 4 is aluminum, wire 14 is also of aluminum. Sleeve 4 is sized to receive end 12 preferably snugly, but the fit is not critical provided it is not extremely loose.

Referring now to Fig. 3, there is shown the completed joint, which is formed as follows: Wire 14 is gripped tightly by conventional means below the terminal 2 (for example, by the jaws of a vise or clamp 16 shown in dotted lines), with the top surface of the means acting as an anvil against which terminal 2 rests. An upsetting tool (indicated by dotted lines 18) is now forced downward (axially) to upset (laterally or radially) the sleeve 4 and end 12 of wire 14 simultaneously to the headed shape shown in Fig. 3. In doing this, the sleeve 4 bulges outwardly (as shown at 20) conforming with the outward bulge of end 12 of wire 14 (as shown at 22).

It should be noted that prior to the insertion of end 12 into sleeve 4, both end 12 and the inside of sleeve 4 should be cleaned. Scratch brushing is a satisfactory method in the case of aluminum, since by this means insulating oxides can be removed.

It is also to be noticed that in the final joint, wire 14 is firmly locked into the enveloping sleeve 4, and that no dirt can enter to destroy the electrical conductivity between the wire and the inside of the sleeve. Also, due to the nature of the joint, moisture cannot enter. In addition, since the aluminum wire is contacting the aluminum component 10, no corrosion will take place at the place where corrosion would be harmful. As to corrosion taking place between the copper and aluminum at the exposed edges of the terminal, experience has shown that in such a composite laminated material, this corrosion may take place, but only to a slight degree and obviously not in a critical location.

Figure 4:
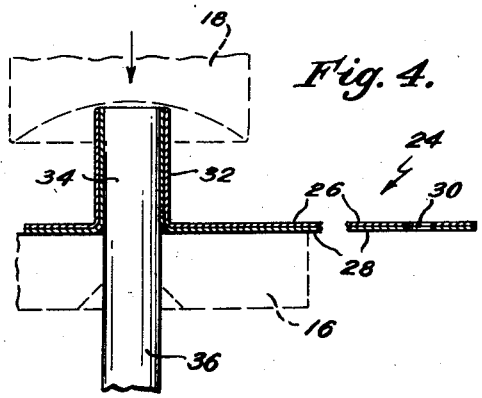
Fig. 4 is a sectional view of a second embodiment of the invention, showing a wire therein preparatory to being fastened.
Figure 5:
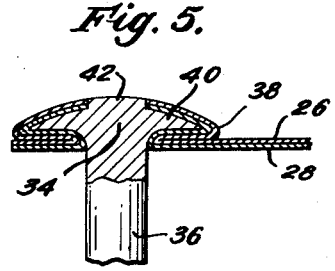
Fig. 5 is a sectional elevation of the Fig. 4 joint, shown in completed form.

Referring now to Figs. 4 and 5 for a description of another embodiment of the invention, there is shown generally at 24 a terminal member made of composite laminated sheet metal having the bonded components 26 of copper and 28 of aluminum. A hole 30 for mounting is provided. At or near one end of terminal 24 is formed or extruded a sleeve 32, in this case having an open end. Referring to Fig. 4 specifically, there is shown inserted in open-ended sleeve 32 one end 34 of wire 36 which is to be fastened to terminal 30. Clamping means 16 are employed to grip wire 36 just as in Fig. 2, and upsetting means 18 is used to upset the sleeve 32 and wire end 34 into the headed shape shown in Fig. 5 specifically. Again, as in Fig. 3, the walls of the sleeve 32 bulge outward as shown at 38 (as well as possibly forming over the top of the wire somewhat) to conform to the headed end of the wire as shown at 40. If the sleeve 32 does not completely close over the headed end of the wire, a small portion 42 of the wire end will be exposed. However, as in the Fig. 1–3 embodiment, the wire will be securely locked into the terminal 24. Also, the aluminum wire is again contacting the aluminum component 28 to give a corrosion-free joint. The cleaning referred to in the description of the Figs. 1–3 embodiment should also be used in this Figs. 4 and 5 embodiment.

Figure 6:
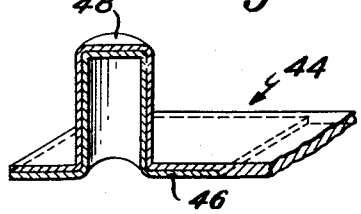
Fig. 6 is a sectional perspective view of a terminal structure used in a third embodiment of the invention.

Illustrated in Fig. 6 is an alternative form of sheet metal terminal 44 which may be used in the embodiments described above, if desired. In this instance, the aluminum component 46 does not extend over the whole length of the terminal, but is inlaid into that portion of the terminal, as shown, from which the closed-end sleeve 48 (or open-ended sleeve, if the Figs. 4 and 5 embodiment is desired) is to be drawn or formed. The rest of the terminal may be of copper (for example), as described above.

Referring now to Figs. 7 and 8, there is shown a still further embodiment of the invention. In this instance, the terminal 50 is a flat sheet metal member having a mounting hole 52 in one end as before. At the other end is provided a hole 54 suitably sized to receive the separate sleeve 56. Sleeve 56 has a flange 58 at one end which overlies the member 50. One end 60 of wire 62 is shown inserted into sleeve 56, as in the Figs. 1–3 embodiment. The finished joint is shown in Fig. 8, the upsetting being done as described for the Figs. 1–3 embodiment. The wire is locked securely to the member 50 by the co-operating expanded head 64 of the wire, the outwardly bulged walls 66 of sleeve 56, and the flange 58.

The terminal 50 and sleeve 56 of Figs. 7–8 have been shown as being single-layered metal. Obviously, the bilayered composite metal described for Figs. 1–6 could be used, if desired.

Finally, Figs. 9 and 10 illustrate a joint made between two wires 68 and 70 in end-to-end relation. The basic principle of the invention is again utilized by providing a sleeve 72 into which preferably snugly fit the ends 74 and 76, respectively, of wires 68 and 70. Clamping means 78 and 80 (illustrated by dotted lines), are used to grip both the sleeve and the wires tightly to prevent slippage during upsetting, as shown, and are then forced together. (If desired, the wires may be gripped instead with the gripping means pushing the ends of the sleeve toward each other axially.) This results in a simultaneous outward bulging or expansion of the sleeve between the clamping means, as shown at 82, and a conforming outward bulging or expansion of the end of each wire as shown at 84 and 86. By this means there results the Fig. 10 joint between the wires in which each wire has a head snugly enveloped by the upset sleeve 72. If desired, of course, the sleeve may be of composite structure having an outer sleeve of copper, for example, for strength; and an inner lining of aluminum (for example) where wires 68 and 70 are aluminum.

Throughout the above description, copper and aluminum have been mentioned as metals that may be used, by way of example. Other ductile metals having the desired mechanical and electrical properties may also be used, such as silver and its alloys, steel, brass, platinum and its alloys, gold and its alloys, or palladium. Also, while cylindrical sleeves have been shown, sleeves of other cross-sectional shapes may be used.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings, shall be interpreted as illustrative and not in a limiting sense.

I claim:

1. A permanent joint between a sheet metal terminal and a solid wire comprising a cupped member forming an integral part of said terminal and snugly enveloping and surrounding on all sides a headed end of said wire, including at least portions of the top and underneath surfaces of said headed end, that portion of said member which lies adjacent said underneath surface being in the form of squeezed-together return fold layers of the material of said member.

2. A permanently joined structure comprising a sheet metal terminal having a sleeve struck up thereon at one end, the interior of said sleeve being of a first metal and the exterior thereof being of a second metal, said metals being firmly bonded together; and a solid wire end extending into said sleeve, said wire being of said first metal; said sleeve and said wire being upset to provide a head on said wire end snugly enveloped by said upset sleeve on all sides, including at least portions of the top and underneath surfaces of said head, that portion of said upset sleeve which lies adjacent said underneath surface being in the form of squeezed-together return fold layers of the material of said sleeve.

References Cited in the file of this patent

UNITED STATES PATENTS

| 650,862 | McTighe | June 5, 1900 |
| 1,915,185 | Gagnon | June 20, 1933 |
| 2,093,775 | Colwell | Sept. 21, 1937 |
| 2,247,829 | Ziegs | July 1, 1941 |
| 2,360,701 | MacFadden | Oct. 17, 1944 |
| 2,366,756 | Spencer | Jan. 9, 1945 |
| 2,447,085 | Odlum | Aug. 17, 1948 |
| 2,452,582 | Litton | Nov. 2, 1948 |
| 2,456,118 | Foster | Dec. 14, 1948 |
| 2,486,610 | Orlando | Nov. 1, 1949 |
| 2,513,365 | Rogoff | July 4, 1950 |
| 2,562,752 | Torgeson | July 31, 1951 |
| 2,603,680 | Snyder | July 15, 1952 |
| 2,623,101 | Kurland | Dec. 23, 1952 |
| 2,664,551 | Kuebler | Dec. 29, 1953 |
| 2,734,933 | Klosin | Feb. 14, 1956 |
| 2,739,369 | Cooney | Mar. 27, 1956 |
| 2,739,370 | Cooney | Mar. 27, 1956 |
| 2,815,497 | Redslob | Dec. 3, 1957 |

FOREIGN PATENTS

| 123,770 | Great Britain | May 25, 1920 |
| 512,124 | Great Britain | Aug. 29, 1939 |